Jan. 16, 1962  E. A. HANYSZ ETAL  3,016,732
MEASUREMENT OF COATING THICKNESSES BY THERMAL MEANS
Filed Oct. 1, 1952

Inventors
Eugene A. Hanysz &
Edward F. Weller Jr.
By Willits, Helwig & Baillio
Attorneys

United States Patent Office 3,016,732
Patented Jan. 16, 1962

3,016,732
MEASUREMENT OF COATING THICKNESSES BY THERMAL MEANS
Eugene A. Hanysz and Edward F. Weller, Jr., Detroit, Mich., assignors to General Motors Corporation, Detroit, Mich., a corporation of Delaware
Filed Oct. 1, 1952, Ser. No. 312,624
3 Claims. (Cl. 73—15)

This invention relates to the thermoelectric measurement of coating thicknesses and particularly to a method for thermoelectrically measuring the thicknesses of electrically nonconductive coatings.

The measurement of electrically nonconductive coating thicknesses heretofore has been a difficult problem in industry where many different types of coatings are used in a variety of applications. Often it is essential that the thickness of a particular coating be carefully controlled. However, many times the coating is applied in such a manner that it is impossible or highly impracticable to obtain an actual physical measurement of the coating thickness for example, as by a micrometer reading or other direct measurement. Measurement of the thickness of a paint or plastic coating applied to an irregularly shaped object for example, has been especially difficult. Some of the prior methods of measuring coating thicknesses have been time-consuming and generally not adaptable for measuring the thicknesses of a variety of different types of coatings in the mass production of coated articles. As a result, in many cases where a measurement of a coating thickness would be desirable, this measurement is not made.

Other prior methods for measuring thicknesses of electrically nonconductive coatings have been destructive in that they either marred or completely destroyed the coating at the point where a thickness measurement was made. Obviously, the use of such methods has been restricted to those applications where the coating is intended to be neither decorative nor protective.

It is a principal object of this invention, therefore, to provide an improved method for measuring the thickness of electrically nonconductive coatings. It is a further object of this invention to provide a method of thermoelectrically measuring the thicknesses of electrically nonconductive coatings. A further object is to provide a nondestructive method of measuring paint and plastic film thicknesses. Other objects of this invention will more fully appear in the description which follows.

Generally, the practice of this invention involves measuring coating thicknesses by making the temperature of a local area of the coated surface, where a thickness measurement is desired, vary with the thickness of the coating. According to the method of this invention, thus, a measurement of this surface temperature by a thermocouple junction established adjacent the surface is indicative of the coating thickness. By properly calibrating a measuring device in the thermocouple circuit, the thickness of the coating may be indicated directly.

Referring now to the figures of the drawing.

Figure 1:
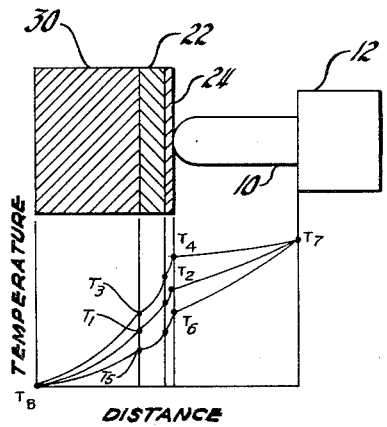
FIGURE 1 is a schematic representation showing how the surface temperature of the coating may vary, depending on the thermal characteristics of the coating layer and of the base material.

Referring more particularly to the figures of the drawing: In FIGURE 1 an attempt has been made to illustrate how the surface temperature of the coating 22 may vary with its thickness. As shown in FIGURE 1, the base member 30 may be of any material having a high thermal mass such as metal, ceramic or glass. The method of this invention generally will operate satisfactorily in measuring the thickness of a coating on any type base material, it being essential only that there is a difference between the thermal conductivity of the base material 30 and the thermal conductivity of the coating 22 to permit the coating surface temperature to vary with the thickness of the coating. Thickness measurements according to this invention for example, may be made when the coating 22 is of any electrically nonconductive material such as glass, wood, rubber, paint, varnish, lacquer, shellac or any plastic material such as phenol-aldehyde resins, urea-formaldehyde resins, vinyl resins, polystyrene, nylon, acrylic resins, silicones or other synthetic materials. The method is applicable as well to the measurement of the composite thickness of a plurality of the same or different coatings.

It will be understood, of course, that by an electrically nonconductive material is meant a material which is substantially a nonconductor of electricity. Thus, it will be understood that the invention is not limited to the measurement of thicknesses of coatings which have an extremely high electrical insulating characteristic under all conditions, but is capable of being applied to any materials normally considered as nonconductors of electricity.

The method of this invention generally involves making the temperature of a local area of a coated surface vary according to the thickness of the coating. If the base material and the electrically nonconductive coating each were perfect thermal conductors having an infinite thermal mass, then applying heat to the surface of the coating in this manner would not change the temperature of the coating and the applied heat would flow freely into it. On the other hand, if the base material and coating each were formed of a perfect thermal insulating material, no heat would be transferred if the surface of the coating were heated and the temperatures throughout would remain constant. However, in a practical application, the thermal characteristics of the actual materials used lie between these impossible limits. Thus, there will be a certain amount of heat flow through the coating with a resulting change in the temperature distribution in a manner dependent on the relative thermal conductivities of the materials. As shown in FIGURE 1, the temperature indicated by $T_B$ represents the average normal temperature of the base material 30 and $T_7$ represents the temperature maintained at the probe heater 12. Curve $T_B$—$T_1$ illustrates how the temperature of the base material gradually increases, when the surface of the coating 22 is heated by the hot probe 10, from $T_B$ up to the temperature at the boundary between the base material 30 and coating 22, indicated as $T_1$. When the coating material 22 has the same thermal conductivity as the base 30, its thickness cannot be measured by the method of this invention since the resulting temperature $T_2$ will not vary with the thickness of the coating 22. However, in most cases the coating and the base material do not have the same or similar thermal conductivities. For example, with most nonmetallic coatings deposited on a metallic base the thermal conductivity of the coating is lower than the thermal conductivity of the base and hence will retard the flow of heat from the heated probe through the coating to the base resulting in increased temperatures $T_3$ and $T_4$. If the thickness of this coating were increased, the surface temperature will increase proportionally. In a like manner, if the thermal conductivity of a coating is greater than the thermal conductivity of the base, lower temperatures $T_5$ and $T_6$, decreasing with an increase in thickness, will result. Hence, as illustrated in FIGURE 1, the temperature adjacent the surface of the coating may vary from $T_5$, for example, to $T_7$ depending on the thickness of the coating and the thermal conductivities of base material and coating.

Figure 2:
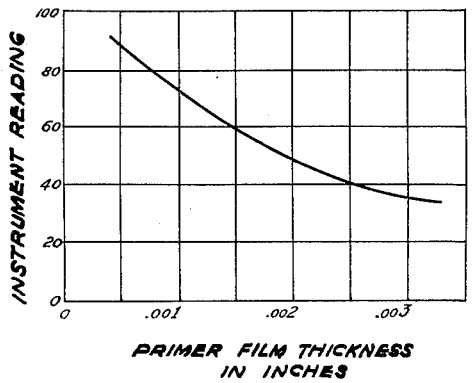
FIGURE 2 is a calibration curve illustrating how readings of the electrical measuring device, obtained according to the method of this invention, may be converted into terms of coating thicknesses for a particular type of coating.

In FIGURE 2 is shown a calibration curve for a particular application of the method of this invention in measuring the thicknesses of a sprayed paint primer coating applied to a steel base. As illustrated in FIGURE 2, the readings of an electrical measuring device here shown as arbitrarily selected relative units, are plotted against coating thicknesses. To obtain data for this curve, several coated steel specimens having known coating thicknesses were tested by a thermoelectric apparatus and the instrument readings plotted against the known thicknesses. In this way, calibration curves such as the one illustrated in FIGURE 2 may readily be obtained for converting readings of the thermoelectric device directly into terms of coating thickness for unknown thicknesses of a coating material having the same thermal conductivity. In calibrating the measuring instrument, it is only essential that the samples having known coating thicknesses used to calibrate the apparatus have the same thermal conductivities as the articles whose coating thicknesses are later to be measured using the calibration curve.

Where a large number of thickness measurements are to be made, as in the mass production of similar coated articles, instead of using a calibration curve to obtain the coating thicknesses, the measuring device may be equipped with a specially calibrated scale thus permitting a direct reading of coating thicknesses. If desired, such a scale may be calibrated merely to indicate satisfactory or unsatisfactory coatings depending on whether or not the coating thicknesses lie within the desired limits.

Figure 3:
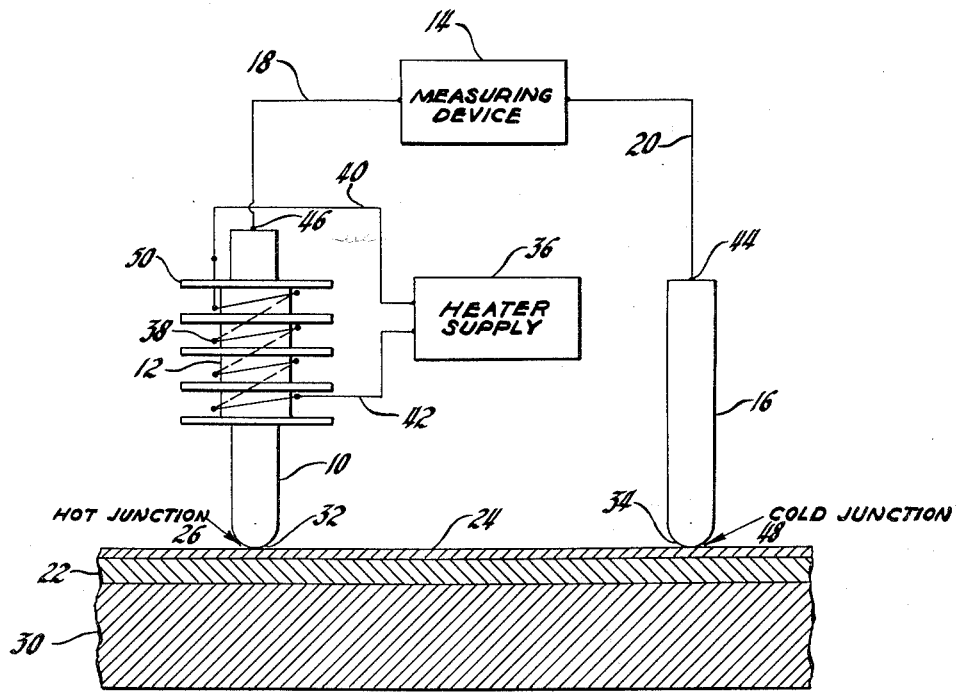
FIGURE 3 is a schematic representation of a thermoelectric measuring device illustrating one specific embodiment of the method of the invention.

FIGURE 3 illustrates generally a thermoelectric apparatus suitable for measuring the thickness of coatings according to one embodiment of this invention. The apparatus as illustrated schematically, comprises a heated probe 10, an unheated probe 16, a probe heater 12 for the heated probe, including a heater supply 36, a coil of resistance wire 38, leads 40 and 42, an electrical measuring device 14 and electrical leads 18 and 20. In the specific embodiment illustrated in FIGURE 1, the electrically nonconductive coating 22, whose thickness is to be measured, is shown with a metallic foil 24 on its surface. This metallic foil 24 serves to provide an electrical connection between the probes 10 and 16, thus completing the thermocouple circuit, and to form thermocouple junctions 26 and 48 adjacent the surface of the coating 22.

The probe members 10 and 16, preferably having convexly curved contact surfaces 32 and 34 which may be formed of any suitable materials conventionally used in thermocouple leads such as cold rolled steel, iron, constantan, nickel or copper.

The foil 24 may generally be formed of any suitable material metallic or nonmetallic having a high thermal and electrical conductivity. Illustrative of suitable materials are copper, steel, silver, constantan or aluminum.

In general, it is preferred to select the materials forming the probes and foil so as to provide combinations of metals which will generate as large an E.M.F. as possible from a small change in the temperature of the coating. For example, it has been found that very beneficial results are obtained when the probes and foil are formed of combinations of copper and nickel, copper and steel or copper and constantan. Since it is the junction of these metals which generates the voltage, it of course is immaterial which of the metals forms the probe and which forms the foil. In a preferred embodiment of the invention, however, most satisfactory results have been obtained using probes formed of cold rolled steel with a copper foil.

While the thickness of the foil 24 may be varied, it is generally desirable to use as thin a foil as possible so that the thermocouple junctions 26 and 48 formed between the foil and the probes will be formed substantially at the surface of the coating 22. Generally, very beneficial results have been obtained with a foil having a thickness of from 0.0005 to 0.0015 inch. In a preferred embodiment the foil may have a thickness of 0.001 inch.

The probe heater 12 for the hot probe 10 generally may be any suitable means capable of maintaining the hot probe at a substantially constant temperature. As illustrated in FIGURE 3, in a preferred form, it may comprise a resistance type heater having a coil of resistance wire 38 formed around a finned section 50 to provide a heater having a high thermal mass to aid in maintaining a constant temperature. To insure accurate readings, thermal equilibrium conditions must exist. Enough heat must be supplied to the hot probe to compensate for heat being removed by flow of heat through the coating whose thickness is being measured. However, in a practical application of the method of this invention, since thermal equilibrium conditions are reached very quickly, a thickness measurement may be obtained practically instantaneously with the application of the measuring apparatus to the coating.

The electrical measuring device 14 may be any suitable electrical measuring apparatus such as a milliammeter, a millivoltmeter, or a galvanometer. If desired, the voltage generated by the probes may be read directly on the electrical measuring device. However, in a preferred embodiment, where a faster response is desired, the generated signal may be fed first through a D.C.—A.C. converter to a voltage amplifier. The output of the amplifier may then be connected to a phase sensitive detector having a differential thermal E.M.F. meter connected in its cathode circuit. If desired, to improve the uniformity of readings, a constant voltage transformer may be used to feed both the amplifier and the probe heater 12. The electrical lead wires 18 and 20 may be of any suitable material such as copper.

While it is true that thermocouple junctions, other than those adjacent the surface of the coating, exist in the apparatus, as for example, at the points 44 and 46 where the electrical leads 18 and 20 are fastened to the probe members, the voltages generated by these thermocouple junctions are the same for all readings and do not affect the accuracy of the surface temperature readings since the voltages generated at these juncttions may be compensated for in the calibration of the measuring instrument for any particular measurements.

While one form of a suitable thermoelectric measuring device is illustrated in FIGURE 3, it is to be understood that any other suitable form of thermoelectric measuring device which utilizes the well known thermocouple principle, i.e. whereby a heated metallic junction generates a small D.C. voltage, may be used to indicate the surface temperature of the coating in accordance with the method of our invention.

While the method of this invention thus far has been disclosed as employing a metallic foil to electrically connect the thermocouple probes and to form thermocouple junctions with the probes, the thermocouple junctions adjacent the surface of the coating may also be formed in other ways. Thus, in a variation of the invention, instead of using an electroconductive foil, the probes 10 and 16 may be electrically connected by any suitable electrical connector such as a wire or other conductor. In using such a conductor it is essential, however, that it be secured to the thermocouple probes at the points which contact the surface of the coating and be relatively thin at these points so that the temperature measured by the thermocouple junctions thus established will be substantially the temperature of the coating. While various types of wire connectors may be used, very beneficial results have been obtained using cold rolled steel probes with a connecting wire formed of constantan. A wire connecting the thermocouple probes may be secured to the probes in any suitable manner as by soldering or brazing. Any additional thermocouple junctions introduced by this type of connection, since it would generate a constant E.M.F., may be compensated for in the calibration of the instrument. However, in a preferred embodiment of the invention, the wire connecting the probes is fused to the probes, as by percussion welding, thus avoiding the introduction of any additional thermocouple junctions.

In another variation of the method of this invention, the thermocouple measuring probes themselves may have an electrically conductive coating, such as an electroplated metallic coating formed of their surfaces 32 and 34 which contact the surface of the coating, with a wire or other conductor connecting the electroplated areas to complete the thermocouple circuit. In this manner, thermocouple junctions are established between the probes and the electrically conductive coatings deposited thereon. An electroplated coating of copper on cold rolled steel probes, for example, using a copper wire to connect the plated areas will give satisfactory results in measuring coating thicknesses according to this method.

In any of the above variations of the invention, it is, of course, desirable that the thickness of the electroconductive layer, i.e. wire, electroplate, etc. between the probes and the surface of the coating, forming the thermocouple junctions with the probes, be as thin as possible so that the temperature measured by the junction will be substantially the temperature of the coating. While the actual thickness of course may be varied in different applications, very beneficial results have been obtained when the thickness of this electroconductive layer is from about 0.0005 to 0.0015 inch.

The actual temperature resulting at the surface of the coating is dependent on the composite thermal conductivity of the base material, of the coating and of the metal foil. Since the thermal conductivity of the foil and base material remains constant, the surface temperature is dependent on the thermal conductivity, and hence the thickness of the coating. While the temperature being measured by the thermocouple junction would be the actual temperature between the probe and the metal foil, by using a thin foil of a material having a high thermal and electrical conductivity, the temperature measured is for all practical purposes the same as the temperature of the coated surface. Any difference between the temperature measured by the thermocouple junction and the actual temperature of the coated surface is very small and since it is essentially constant, will be compensated for in the calibration of the instrument.

As an illustrative example of measuring coating thicknesses according to the method of this invention, apparatus as shown generally in FIGURE 3 may be used. In this example the heated probe 10 and an unheated probe 16 may be placed against the metal foil 24 in contact with the surface of the coating whose thickness is to be measured. Placing the probes against the metal foil on the surface of the coating in this manner causes a small area of the electrically nonconductive coating 22 under the hot probe 10 to become heated. After a thermal equilibrium condition has been reached, in most cases almost instantaneously, the reading of the electrical measuring device is observed. Using a previously prepared calibration curve, this reading may be converted into terms of coating thickness.

While the invention thus far has been disclosed as employing a thermoelectric measuring apparatus utilizing two probe members, it is to be understood that the method of the invention is not limited to the use of an apparatus having two thermocouple probes. Hence, according to this invention the temperature at the surface of the electrically nonconductive coating may also be measured by using a conventional thermocouple having only a heated junction formed adjacent the surface of the coating and having no other thermocouple junction in contrast with the surface of the coating. Since the method of this invention depends upon the temperature of the coating surface varying with the thickness of the coating, any suitable method of thermo-electrically measuring this temperature may be used to indicate thickness. Likewise, more than two thermocouple probes may be used where the composite E.M.F. generated may be used to indicate an average coating thickness over a given area. However, in a preferred embodiment of this invention a thermoelectric measuring apparatus as illustrated generally in FIGURE 3, having both a heated and an unheated probe, would be used because the use of an unheated probe, also forming a thermocouple junction adjacent the surface of the coating, permits more accurate readings since it automatically compensates for any variations in ambient temperatures or other conditions which would otherwise affect the voltage generated by the thermocouple junction used to measure the coating thickness. By having the probes connected in series, the E.M.F.'s generated at each junction oppose each other and any effect on the temperature of the coating surface produced by a change in the ambient temperature is compensated for by having the voltages generated at each thermocouple junction oppose each other. The resulting differential E.M.F. measured by the instrument will depend only on thickness of the coating and will remain unaffected by changes in the ambient temperature.

While the temperatures used in this method of measuring thicknesses may be varied, in a typical application it has been found that very beneficial results are obtained by maintaining the temperature of the probe heater 12 at a temperature from 150° to 170° F. Because of the high thermal mass of the probe heater, the heated probe will quickly assume the temperature of the heater when the probe is not in contact with a coating surface. The temperature of the heated probe in contact with a coating surface, of course, will vary with the particular material being measured. However, in a typical case, with the probe heater maintained at a temperature within the range of 150° to 170° F., the temperature of the heated thermocouple junction 26 adjacent the surface of the coating will be within the range of about 100° to 110° F.

It is to be understood, however, that these temperatures are only illustrative of typically practicable operating conditions and may be varied depending on such factors as the nature of the coating, its thickness and thermal conductivity. The method of this invention generally will operate satisfactorily over a wide range of temperatures and is limited only by the practical considerations of operating within temperature ranges in which the materials whose thickness is being measured, as well as the materials from which the apparatus is formed, are not adversely affected. The method may be used to measure any conventional thicknesses of paints, plastic or other electrically nonconductive coatings since it is only essential that a temperature differential be maintained between the surface of the coating and a probe heater so that there will be a flow of heat with a resulting change in temperature distribution. This temperature difference, of course, may be maintained at any practical temperature level.

It will be understood, of course, that instead of using a heated probe as the measuring probe, since a separate E.M.F. is generated at each junction, if desired, a cooled thermocouple probe may also be used as a measuring probe. This would also insure a temperature gradient between the measuring probe and coating.

While the method of this invention has been described in some detail as being applicable for measuring thicknesses of deposited coatings, it may also be used to measure the thicknesses of electrically nonconductive sheets or films which are unattached to any base material. In this modification of the invention it is only necessary to provide a suitable backing material having a high thermal mass against which the film or sheet may be placed. A suitable backing material may be a layer of metal or other material having a thermal conductivity differing from the thermal conductivity of the electrically nonconductive sheet or film. It is not necessary that the film or sheet be attached to this backing material. The film or sheet need only be placed in contact with the backing material so that heat may flow between the film or sheet and the backing material.

It is to be understood that, although the invention has been described with specific reference to particular embodiments thereof, it is not to be so limited since changes and alterations therein may be made which are within the full intended scope of this invention as defined by the appended claims.

We claim:

1. The method of measuring the thickness of an electrically nonconductive coating on a base material of substantial heat absorbing capacity comprising the steps of applying heat to one point on the surface of the coating at which its thickness is to be measured thereby establishing a tempertaure gradient of heat transmission through the coating to the base material dependent upon the coating thickness at said point, and measuring the difference in temperature between said point and a point thermally remote therefrom on said surface.

2. A method of measuring the thickness of an electrically nonconductive coating on a metallic backing having a thermal conductivity which is different than the thermal conductivity of said coating comprising the steps of applying heat to the surface of said coating at a first point where a thickness measurement is desired to thereby produce a temperature at said localized point which will vary by reason of heat conductivity according to the thickness of said coating, and measuring the temperature differential between said first point and a second point on the surface of said coating which is spaced from said first point and unaffected by the heat applied at said first point for comparison with the temperature differential obtained between like points on a coating of known thickness on an equivalent metallic backing.

3. A method of measuring the thickness of an electrically nonconductive coating on a metallic backing having a thermal conductivity which is different than the thermal conductivity of said coating comprising the steps of applying a thin electrically conductive member to the surface of said coating, applying heat to the surface of said conductive member at a first point where a thickness measurement of said coating is desired to thereby produce a temperature at said first point which will vary by reason of heat conductivity according to the thickness of said coating, establishing a thermocouple junction with said conductive member at said first point, establishing a second thermocouple junction with said conductive member at a point on the surface thereof which is spaced from said first point and unaffected by the heat applied at said first point, and measuring the difference in electrical potentials generated at said thermocouple junctions for comparison with the difference in electrical potentials obtained with like junctions with a coating of known thickness.

References Cited in the file of this patent

UNITED STATES PATENTS

| 1,648,899 | Hayman | Nov. 15, 1927 |
| 2,264,968 | De Forest | Dec. 2, 1941 |
| 2,330,599 | Kuehni | Sept. 28, 1943 |
| 2,342,029 | Zubko | Feb. 15, 1944 |
| 2,750,791 | Hanysz et al. | June 19, 1956 |

FOREIGN PATENTS

| 23,580 | Germany | Sept. 5, 1883 |
| 44,463 | Denmark | Aug. 10, 1931 |
| 270,583 | Germany | June 29, 1913 |

OTHER REFERENCES

"Ganot's Physics," 15th edition, section 411, page 395.